(12) United States Patent
Waugh et al.

(10) Patent No.: US 10,180,201 B2
(45) Date of Patent: Jan. 15, 2019

(54) ELECTROSTATIC BONDING OF COAXIAL TUBING

(75) Inventors: Gregory M. Waugh, Renton, WA (US); Michael Lyle Holbrook, Port Townsend, WA (US); Ronald Lawrence Clements, Kent, WA (US)

(73) Assignee: The Boeing Company, Chicago, IL (US)

( * ) Notice: Subject to any disclaimer, the term of this patent is extended or adjusted under 35 U.S.C. 154(b) by 268 days.

(21) Appl. No.: 13/248,756

(22) Filed: Sep. 29, 2011

(65) Prior Publication Data
US 2013/0081734 A1  Apr. 4, 2013

(51) Int. Cl.
| | | |
|---|---|---|
| *F16L 9/14* | (2006.01) | |
| *H01R 43/00* | (2006.01) | |
| *F16L 7/00* | (2006.01) | |
| *A62C 3/08* | (2006.01) | |
| *F16L 9/18* | (2006.01) | |
| *B64C 3/34* | (2006.01) | |
| *B64D 37/00* | (2006.01) | |

(Continued)

(52) U.S. Cl.
CPC .............. *F16L 7/00* (2013.01); *A62C 3/08* (2013.01); *F16L 9/18* (2013.01); *B64C 3/34* (2013.01); *B64D 37/005* (2013.01); *B64D 37/32* (2013.01); *B64D 45/02* (2013.01); *Y10T 29/49117* (2015.01)

(58) Field of Classification Search
CPC ...... F16L 7/00; F16L 9/18; B64C 3/34; B64D 37/005; B64D 37/32; B64D 45/02; A62C 3/08

USPC ........ 138/113, 114, 137, 138, 141, 148, 149
See application file for complete search history.

(56) References Cited

U.S. PATENT DOCUMENTS

| | | | | |
|---|---|---|---|---|
| 951,342 A | * | 3/1910 | Sherwood | 138/113 |
| 2,475,635 A | | 7/1949 | Parsons | |
| 3,354,691 A | * | 11/1967 | Hall, Jr. | 72/371 |

(Continued)

FOREIGN PATENT DOCUMENTS

| | | |
|---|---|---|
| CN | 1093151 A | 10/1994 |
| EP | 2189702 A1 | 5/2010 |

(Continued)

OTHER PUBLICATIONS

PCT search report dated Nov. 19, 2012 regarding application PCT/US2012/052211, filed Aug. 24, 2012, applicant The Boeing Company, 10 pages.

(Continued)

*Primary Examiner* — Nicholas J Weiss
(74) *Attorney, Agent, or Firm* — Yee & Associates, P.C.

(57) ABSTRACT

A method and apparatus for electrostatically bonding coaxial tubing. An outer tube comprises an electrically conductive material and has an inner surface. An inner tube comprises material and has an outer surface. The inner tube and the outer tube are positioned to define a channel. A bridging structure comprising an electrically conductive material is positioned such that the bridging structure forms mechanical contact and an electrostatic connection between electrically conductive material on the tubes. The bridging structure is in mechanical contact with the inner surface of the outer tube at a first plurality of points and in mechanical contact with the outer surface of the inner tube at a second plurality of points.

20 Claims, 6 Drawing Sheets (51) Int. Cl.
*B64D 37/32* (2006.01)
*B64D 45/02* (2006.01)

(56) References Cited

U.S. PATENT DOCUMENTS

| | | | |
|---|---|---|---|
| 3,440,830 A | | 4/1969 | Wright et al. |
| 3,837,444 A | | 9/1974 | Allinquant et al. |
| 4,649,903 A | * | 3/1987 | Takeuchi et al. ............. 126/653 |
| 5,803,127 A | * | 9/1998 | Rains ............................ 138/113 |
| 5,959,828 A | * | 9/1999 | Lewis et al. ................... 361/215 |
| 6,848,720 B2 | * | 2/2005 | Carns et al. ............. 285/123.15 |
| 8,356,635 B2 | * | 1/2013 | Bouleti et al. ................ 138/109 |
| 2008/0078880 A1 | * | 4/2008 | Petit .......................... 244/135 R |
| 2009/0025815 A1 | * | 1/2009 | Becks et al. .................. 138/112 |
| 2010/0147446 A1 | * | 6/2010 | Ciolczyk et al. ............. 156/191 |
| 2011/0284694 A1 | * | 11/2011 | Yamaguchi et al. ...... 244/135 R |

FOREIGN PATENT DOCUMENTS

| | | | | |
|---|---|---|---|---|
| FR | 1578857 A | | 8/1969 | |
| JP | 2002107696 A | | 4/2002 | |
| WO | WO2012088055 A1 | * | 6/2012 | ............... F16L 3/18 |

OTHER PUBLICATIONS

International Preliminary Report on Patentability, dated Apr. 1, 2014, regarding Application No. PCT/US2012/052211, 6 pages.
Notice of Reasons for Rejection (English Translation), dated Nov. 24, 2015, regarding Japanese Patent Application No. 2014-533533, 2 pages.
State Intellectual Property Office of the PRC Notification of First Office Action, dated Feb. 2, 2015, regarding Application No. 201280048227.2, 8 pages.
Canadian Intellectual Property Office Examination Report, dated Feb. 1, 2016, regarding Application No. 2,843,765, 3 pages.
European Patent Office Examination Report, dated Jun. 8, 2016, regarding Application No. 12753360.2, 5 pages.
European Patent Office Telephone Minutes, dated Sep. 22, 2017, regarding Application No. 12753360.2, 4 pages.

* cited by examiner

ELECTROSTATIC BONDING OF COAXIAL TUBING

BACKGROUND INFORMATION

1. Field

The present disclosure relates generally to coaxial tubing used in vehicles, such as aircraft. More particularly, the present disclosure relates to forming an electrostatic connection between the outer tube and the inner tube of coaxial tubing without creating an inconsistency in the tubing surfaces.

2. Background

Tubing is used to carry various fluids through aircraft and other vehicles. For example, tubing may be used in an aircraft to carry hydraulic fluid that is used by hydraulic systems on the aircraft. As another example, tubing is used in an aircraft to carry fuel between fuel tanks and the aircraft engines. Tubing may be used to carry other fluids on aircraft and other vehicles.

It is desired that the tubing used on aircraft may have various characteristics that improve aircraft performance and safety. For example, using lighter tubing on an aircraft may improve aircraft performance by improving fuel efficiency. Using tubing that is more resistant to undesirable inconsistencies may improve aircraft performance by reducing the need for reworking or replacing tubing with undesirable inconsistencies. Using tubing that is more resistant to undesirable inconsistencies also may improve aircraft safety.

Tubing used on aircraft may be made of materials that provide the desirable characteristics of lighter weight and improved resistance to undesirable inconsistencies. For example, tubing made of titanium provides these desired characteristics. Tubing made of other materials or of various materials in combination also may provide these characteristics.

It also is desirable that tubing on aircraft provides thermal insulation between the fluid carried in the tubing and adjacent structures of the aircraft through which the tubing is run. Such insulation is desirable to reduce heat transfer between the fluid carried in the tubing and the adjacent aircraft structures. Heat transfer between the fluid carried in the tubing and adjacent aircraft structures may affect the fluid, the adjacent structures, or both in undesired ways.

Thermal insulation between the fluid carried in tubing and adjacent aircraft structures may be provided by the use of coaxial tubing. Coaxial tubing includes an inner tube that is surrounded by an outer tube. A fluid, such as hydraulic fluid, fuel, or another fluid, is carried in the inner tube. The outer tube is separated from the inner tube to form a channel between the inner tube and the outer tube. This channel forms a gap between the tubes that may be filled with a thermally insulating material. For example, the channel between the tubes may be filled with air, another thermally insulating gas, with another thermally insulating fluid, or with other materials.

The use of coaxial tubing on aircraft also may improve aircraft safety. For example, an undesired leak of fluid from the inner tube of the coaxial tube will flow or otherwise be discharged into the channel between the inner tube and the outer tube. The leak of fluid from the inner tube is contained by the outer tube of the coaxial tube in the channel between the tubes. The outer tube of the coaxial tube thus prevents the leak of fluid from the inner tube from reaching other aircraft components, which otherwise might affect operation of the other aircraft components in undesired ways.

The air or other thermally insulating material in the channel between the tubes of a coaxial tube used in an aircraft typically also is electrically insulating. The tubes of the coaxial tube used in the aircraft may be made of an electrically conducting material, such as titanium or another electrically conducting material. In this case, in some operating environments or conditions, an electrical charge or current may form on one or both of the tubes of the coaxial tube. For example, a lightning strike on the aircraft may cause such a build-up of charge or current in the coaxial tube. Since the tubes in the coaxial tube are separated by an electrically insulating channel and charge cannot flow freely between the tubes, this build-up of charge or current may cause an electrical discharge in the form of a spark across the channel between the tubes. Such a discharge is undesirable. For example, any fuel vapor or other combustible material in the channel between the tubes of the coaxial tube may be ignited by a spark across the channel.

Current methods and systems for preventing an electrical discharge across the channel between the tubes of a coaxial tube may not remain fully effective in various conditions or over extended periods of time. Furthermore, current methods and systems for preventing an electrical discharge in a coaxial tube may affect the performance of the tube in undesired ways.

Accordingly, it would be advantageous to have a method and apparatus that takes into account one or more of the issues discussed above, as well as other possible issues.

SUMMARY

An advantageous embodiment of the present disclosure provides an apparatus comprising an outer tube, an inner tube, and a bridging structure. The outer tube comprises an electrically conductive material and has an inner surface. The inner tube comprises an electrically conductive material and has an outer surface. The inner tube is positioned inside the outer tube such that the outer surface of the inner tube and the inner surface of the outer tube define a channel. The bridging structure comprises an electrically conductive material positioned in the channel such that the bridging structure forms mechanical contact and an electrostatic connection between electrically conductive material on the inner surface of the outer tube and electrically conductive material on the outer surface of the inner tube. The bridging structure is in mechanical contact with the inner surface of the outer tube at a plurality of first points. The bridging structure is in mechanical contact with the outer surface of the inner tube at a plurality of second points.

Another advantageous embodiment of the present disclosure provides a method for electrically bonding tubing. A bridging structure comprising an electrically conductive material is placed in a channel between an outer tube and an inner tube to form an electrostatic connection between an electrically conductive material on an inner surface of the outer tube and an electrically conductive material on the outer surface of the inner tube. The bridging structure is placed in mechanical contact with the inner surface of the outer tube at a plurality of first points. The bridging structure is in mechanical contact with the outer surface of the inner tube at a plurality of second points.

Another advantageous embodiment provides an apparatus comprising an outer tube, an inner tube, a spring, a first retainer, and a second retainer. The outer tube comprises an electrically conductive material and has an inner surface. The inner tube comprises an electrically conductive material and has an outer surface. The inner tube is positioned inside the outer tube such that the outer surface of the inner tube and the inner surface of the outer tube define a channel. The spring comprises an electrically conductive material positioned in the channel such that the spring forms an electrostatic connection between the electrically conductive material on the inner surface of the outer tube and the electrically conductive material on the outer surface of the inner tube. The spring is in mechanical contact with the inner surface of the outer tube at a plurality of first points. The spring is in mechanical contact with the outer surface of the inner tube at a plurality of second points. The first retainer is positioned in the channel on one side of the spring. The second retainer is positioned in the channel on another side of the spring. The spring is positioned between the first retainer and the second retainer, and the first retainer and the second retainer prevent movement of the spring in the channel.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. "A number", as used herein with reference to items, means one or more items. For example, "a number of different considerations" means one or more different considerations.

The different advantageous embodiments recognize and take into account that in some applications where the use of a coaxial tube is desirable, it is desirable to provide an electrostatic connection between the inner and outer tubes of the coaxial tube. For example, it is desirable to provide an electrostatic bond between the inner and outer tubes of a coaxial tube in an aircraft to support safe aircraft operation in various electromagnetic operating conditions and environments.

The different advantageous embodiments recognize and take into account that an electrostatic connection between the tubes of a coaxial tube may be made using bonding jumpers. For example, wires may be secured between the inner and outer tubes of a coaxial tube using mechanical clamps and fastener hardware. However, the use of mechanical fasteners and clamps may result in undetectable inconsistencies that may provide sources for electrostatic sparks and ignition of combustible materials in the channel between the tubes.

The different advantageous embodiments also recognize and take into account that an electrostatic connection between the tubes of a coaxial tube may be made by brazing. However, the temperatures required to melt the brazing material is such that it anneals the titanium material of which the tubes may be made. Therefore, brazing may cause inconsistencies in the tubes of the coaxial tube. Such inconsistencies may affect the performance and life of the tubes in undesired ways.

The different advantageous embodiments also recognize and take into account that an electrostatic connection between the tubes of a coaxial tube may be made by welding. However, the welding operation may impart inconsistencies in the tubes. Such inconsistencies may affect the performance and life of the coaxial tube in undesired ways.

The different advantageous embodiments also recognize and take into account that an electrostatic connection between the tubes of a coaxial tube may be made by roller swaging. However, this possible solution requires the development of new tooling and processes. Furthermore, this process has some known issues that may limit the life and functional capabilities of the coaxial tubes.

Therefore, one or more of the advantageous embodiments provides a method and apparatus for electrostatic bonding of coaxial tubes without affecting the performance or life of the tubes in an undesired manner. In accordance with an advantageous embodiment, a bridging structure of electrically conductive material is placed in the channel between the inner and outer tubes of a coaxial tube to form an electrostatic connection between the tubes. The bridging material maintains contact with both the inner tube and the outer tube at a plurality of points. The bridging structure may form and maintain an electrostatic connection between the inner tube and the outer tube without creating any undesired inconsistencies in the tubes.

Figure 1:
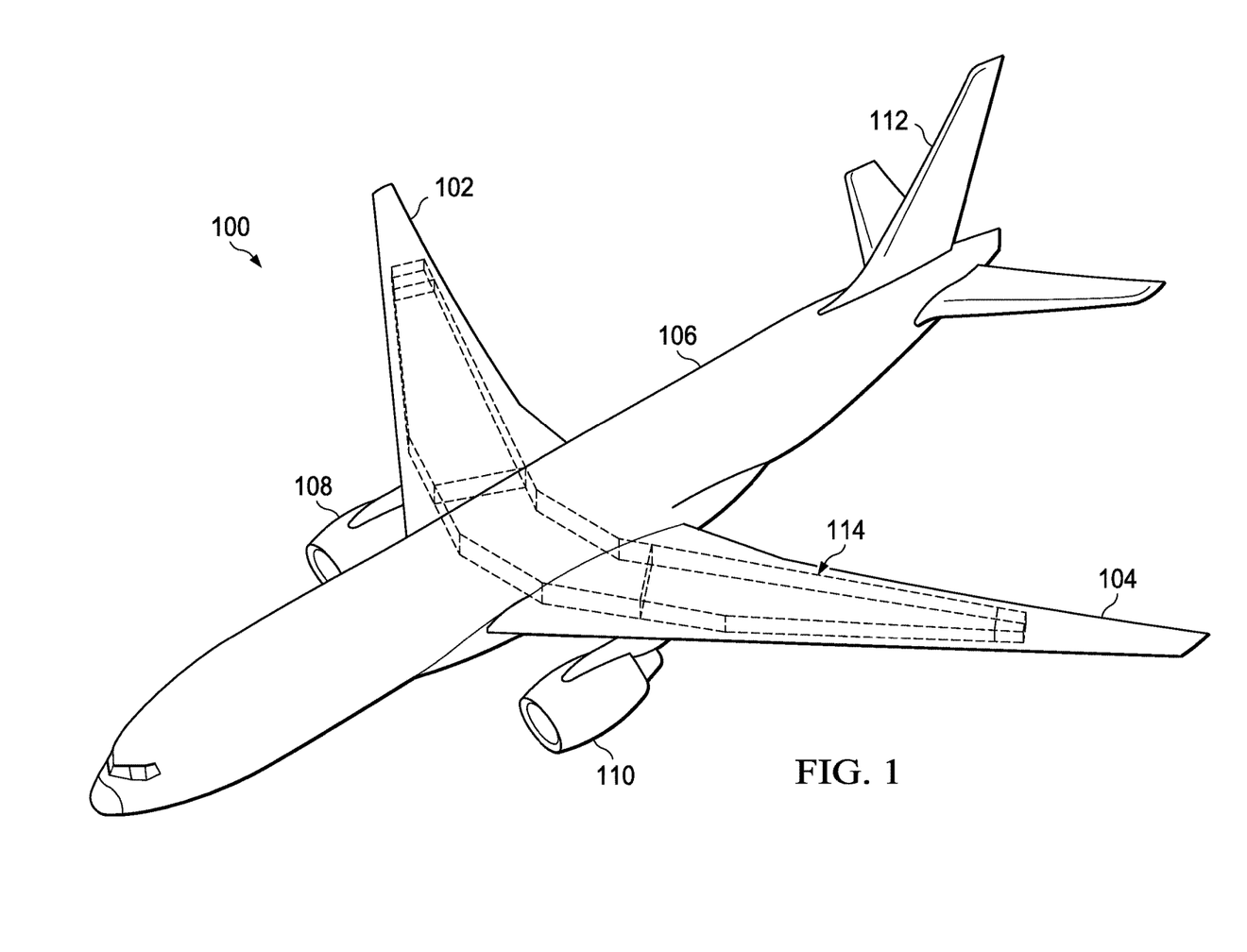
FIG. 1 is an illustration of an aircraft in accordance with an advantageous embodiment.

Turning now to FIG. 1, an illustration of an aircraft is depicted in accordance with an advantageous embodiment.

Aircraft 100 is an example of a vehicle in which a method and apparatus for electrostatic bonding in accordance with an advantageous embodiment may be implemented. In this advantageous embodiment, aircraft 100 has wings 102 and 104 attached to body 106. Aircraft 100 includes wing-mounted engine 108, wing-mounted engine 110, and tail 112.

Aircraft 100 also includes internal structures 114. For example, internal structures 114 may provide structural support for wings 102 and 104 and wing-mounted engines 108 and 110. Internal structures 114 also may form fuel tanks or other structures for aircraft 100.

Figure 2:
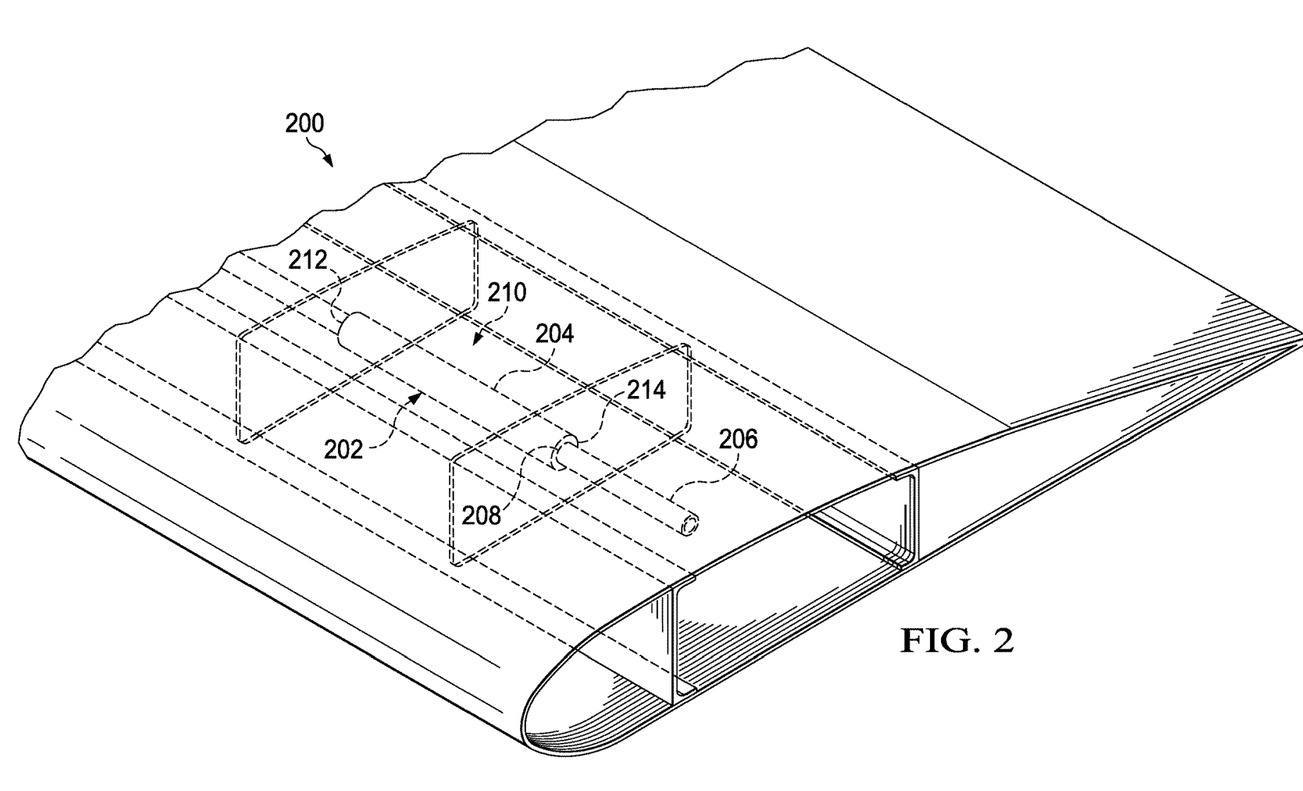
FIG. 2 is an illustration of a portion of an internal structure of an aircraft in accordance with an advantageous embodiment.

With reference now to FIG. 2, an illustration of a portion of an internal structure of an aircraft is depicted in accordance with an advantageous embodiment. In this example, a portion of the internal structure of wing 200 is depicted in accordance with an advantageous embodiment. Wing 200 is an example of wing 104 in FIG. 1.

Coaxial tube 202 may be used to carry fluid through the internal structure of wing 200 or through the internal structure of another portion of an aircraft. For example, without limitation, coaxial tube 202 may be used to carry hydraulic fluid, fuel, or another fluid through wing 200.

Coaxial tube 202 includes outer tube 204 and inner tube 206. Inner tube 206 carries the hydraulic fluid, fuel, or other fluid through wing 200. Inner tube 206 is placed inside outer tube 204. Inner tube 206 is separated from outer tube 204 to form channel 208 between inner tube 206 and outer tube 204. Channel 208 provides thermal insulation between inner tube 206 and outer tube 204. For example, channel 208 may contain a thermally insulating gas or other material, such as air or another thermally insulating material. Channel 208 also provides electrical separation between inner tube 206 and outer tube 204.

Outer tube 204 may surround inner tube 206 along the entire length of inner tube 206. Alternatively, as illustrated, outer tube 204 may surround a portion of inner tube 206. For example, without limitation, outer tube 204 may surround a portion of inner tube 206 where inner tube 206 passes through or near structure 210 in wing 200. For example, without limitation, structure 210 may be a fuel tank or other structure in wing 200.

In any case, where outer tube 204 surrounds a portion of inner tube 206, outer tube 204 may have ends 212 and 214. In this case, inner tube 206 extends from outer tube 204 beyond ends 212 and 214 of outer tube 204.

Figure 3:
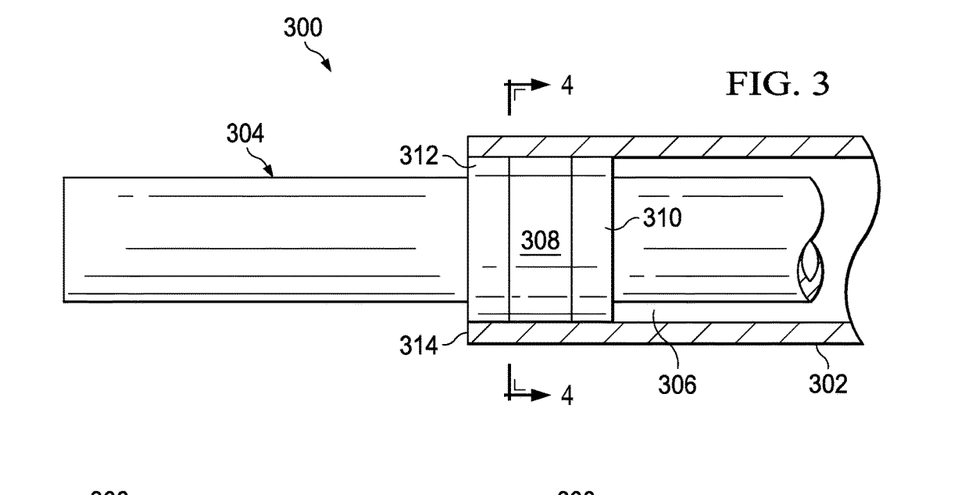
FIG. 3 is an illustration of electrostatic bonding of coaxial tubing in accordance with an advantageous embodiment.

Turning now to FIG. 3, an illustration of electrostatic bonding of coaxial tubing is depicted in accordance with an advantageous embodiment. In this example, coaxial tube 300 is an example of one implementation of coaxial tube 202 in FIG. 2.

Coaxial tube 300 includes outer tube 302 and inner tube 304. Inner tube 304 is positioned inside of outer tube 302. Inner tube 304 is separated from outer tube 302 to form channel 306 between inner tube 304 and outer tube 302.

In accordance with an advantageous embodiment, bridging structure 308 is positioned in channel 306 such that bridging structure 308 forms an electrostatic connection between outer tube 302 and inner tube 304. Bridging structure 308 is made of an electrically conducting material and may have a variety of forms.

Bridging structure 308 is in mechanical contact with outer tube 302 at a plurality of points and is in mechanical contact with inner tube 304 at a plurality of points. Bridging structure 308 may or may not be attached to outer tube 302 or to inner tube 304 at any point. The size and shape of bridging structure 308 may be selected so that bridging structure 308 maintains mechanical contact with outer tube 302 and inner tube 304 without requiring that bridging structure 308 be attached to outer tube 302 or to inner tube 304. The size and shape of bridging structure 308 also may be selected so that bridging structure 308 may be positioned and retained in coaxial tube 300 without causing inconsistencies in outer tube 302 and inner tube 304 during placement of bridging structure 308 in coaxial tube 300 or over the time that bridging structure 308 is maintained in coaxial tube 300.

First retainer 310 may be positioned in channel 306 on one side of bridging structure 308. Second retainer 312 may be positioned in channel 306 on another side of bridging structure 308. Therefore, bridging structure 308 is positioned between first retainer 310 and second retainer 312 in channel 306. First retainer 310 and second retainer 312 are configured to prevent movement of bridging structure 308 in channel 306. Preferably, first retainer 310 and second retainer 312 may be held in position in channel 306 in any appropriate manner that does not cause inconsistencies in outer tube 302 or inner tube 304. For example, without limitation, first retainer 310 and second retainer 312 may be held in position in channel 306 by a mechanical interference fit between each of first retainer 310 and second retainer 312 and outer tube 302 and inner tube 304. Alternatively, first retainer 310 and second retainer 312 may be held in position in channel 306 using an appropriate adhesive.

In accordance with an advantageous example, first retainer 310, bridging structure 308, and second retainer 312 may be positioned at or near end 314 of outer tube 302. In particular, second retainer 312 may be positioned at end 314 of outer tube 302. Inner tube 304 extends from end 314 of outer tube 302.

A seal may be placed at end 314 of outer tube 302 adjacent to second retainer 312. Such a seal may be used to prevent any gas, liquid, or other material in channel 306 from leaking out of end 314 of outer tube 302. The seal may be formed of any material or combination of materials that is formed to completely block channel 306 at or near end 314 of outer tube 302. Appropriate material or materials for the seal may be selected based upon the gas, liquid, or other material in channel 306 that is to be contained by the seal. Alternatively or additionally, second retainer 312, first retainer 310, or both may be configured to provide such a seal. In this case, second retainer 312, first retainer 310, or both may be made of the appropriate material and formed to completely block channel 306 between outer tuber 302 and inner tube 304.

Figure 4:
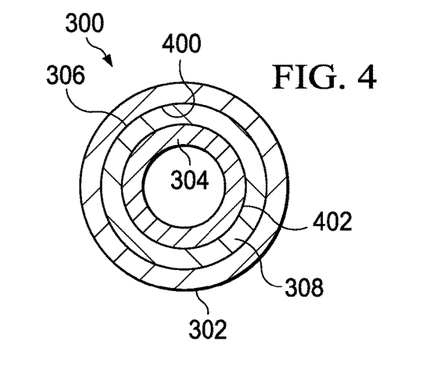
FIG. 4 is an illustration of electrostatic bonding of coaxial tubing in accordance with an advantageous embodiment.

Turning now to FIG. 4, an illustration of electrostatic bonding of the coaxial tubing in FIG. 3 is depicted as taken along line 4-4 of FIG. 3. In accordance with an advantageous embodiment, as illustrated, bridging structure 308 preferably extends entirely around channel 306 formed between inner surface 400 of outer tube 302 and outer surface 402 of inner tube 304. In an alternative embodiment, bridging structure 308 may extend partially around channel 306.

Figure 5:
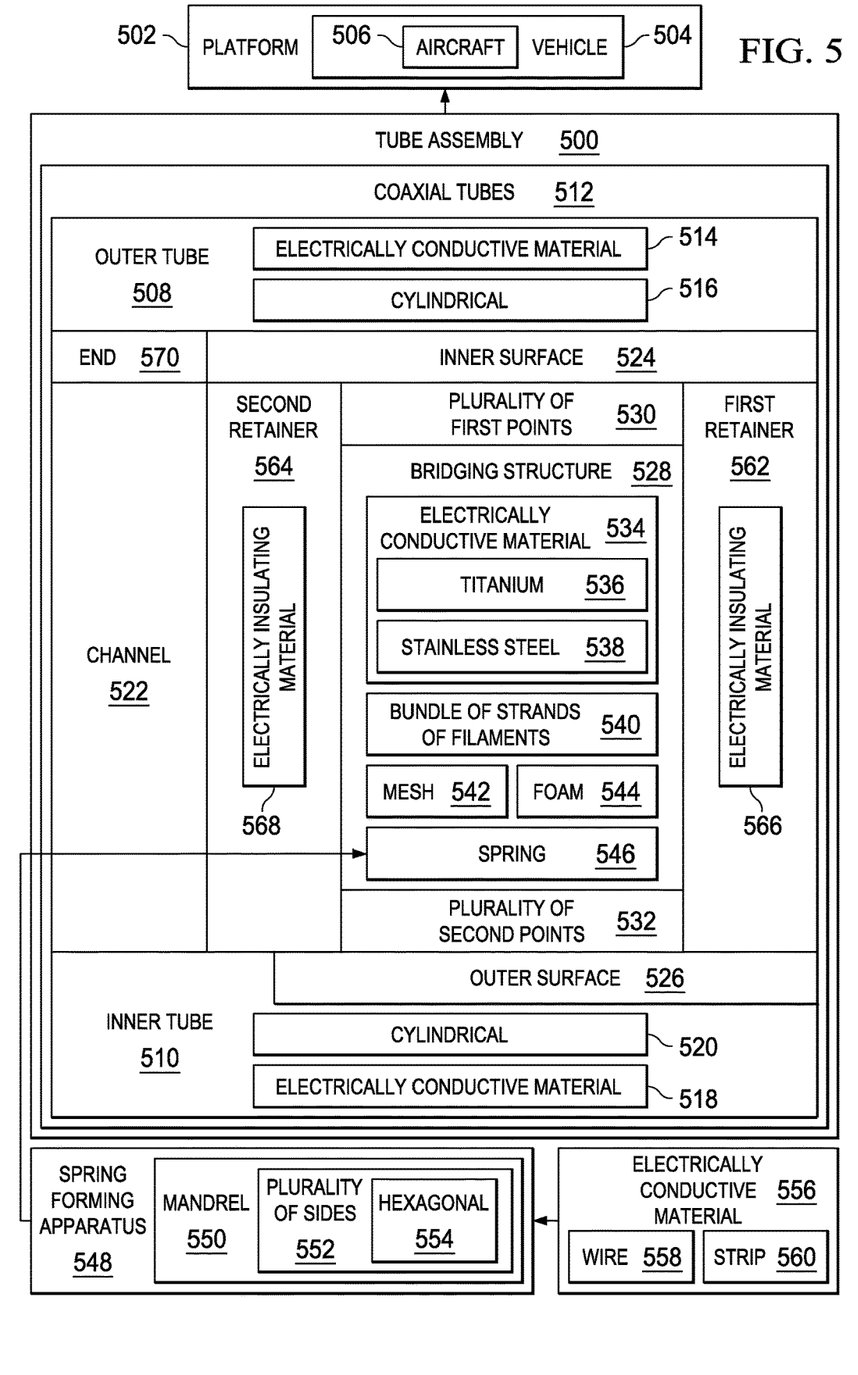
FIG. 5 is an illustration of a block diagram of a tube assembly in accordance with an advantageous embodiment.

Turning now to FIG. 5, an illustration of a block diagram of a tube assembly is depicted in accordance with an advantageous embodiment. Coaxial tube 300 in FIG. 3 and FIG. 4 is an example of one implementation of tube assembly 500 in FIG. 5.

Tube assembly 500 is an electrostatically bonded tube assembly. Tube assembly 500 may be installed in platform 502 to carry any desired fluid in platform 502. For example, without limitation, platform 502 may be vehicle 504, such as aircraft 506. Alternatively, vehicle 504 may be any other aerospace vehicle that is capable of travelling through the air, through space, or both. As another example, vehicle 504 may be a vehicle for travelling over land or on or beneath water.

Tube assembly 500 includes outer tube 508 and inner tube 510. Inner tube 510 is positioned inside of outer tube 508. Inner tube 510 and outer tube 508 may be coaxial tubes 512. In a case where inner tube 510 and outer tube 508 are coaxial tubes 512, an axis of inner tube 510 is aligned with an axis of outer tube 508. Alternatively, the axis of inner tube 510 may not be aligned with the axis of outer tube 508.

Outer tube 508 may be made of electrically conductive material 514. For example, without limitation, outer tube 508 may be made of titanium, another electrically conductive material, or of a combination of electrically conductive materials.

Outer tube 508 may be cylindrical 516. In this case, the cross-section of outer tube 508 perpendicular to the axis of outer tube 508 is circular. Alternatively, the cross-section of outer tube 508 perpendicular to the axis of outer tube 508 may be a shape other than circular. Furthermore, the shape, size, or both the shape and size of the cross-section of outer tube 508 perpendicular to the axis of outer tube 508 may be the same along the length of outer tube 508 or may be different at various points along the length of outer tube 508.

Inner tube 510 may be made of electrically conductive material 518. For example, without limitation, inner tube 510 may be made of titanium, another electrically conductive material, or of a combination of electrically conductive materials.

Inner tube 510 may be cylindrical 520. In this case, the cross-section of inner tube 510 perpendicular to the axis of inner tube 510 is circular. Alternatively, the cross-section of inner tube 510 perpendicular to the axis of inner tube 510 may be a shape other than circular. Furthermore, the shape, size, or both the shape and size of the cross-section of inner tube 510 perpendicular to the axis of inner tube 510 may be the same along the length of inner tube 510 or may be different at various points along the length of inner tube 510.

Outer tube 508 and inner tube 510 are separated by channel 522. Specifically, channel 522 is defined by inner surface 524 of outer tube 508 and outer surface 526 of inner tube 510.

In accordance with an advantageous embodiment, bridging structure 528 is positioned in channel 522 to form an electrostatic connection between outer tube 508 and inner tube 510. Specifically, bridging structure 528 forms an electrostatic connection between electrically conductive material 514 on inner surface 524 of outer tube 508 and electrically conductive material 518 on outer surface 526 of inner tube 510.

In accordance with an advantageous embodiment, bridging structure 528 is in mechanical contact with inner surface 524 of outer tube 508 at plurality of first points 530 on inner surface 524. Bridging structure 528 is in mechanical contact with outer surface 526 of inner tube 510 at plurality of second points 532 on outer surface 526. In accordance with an advantageous embodiment, bridging structure 528 does not cause any inconsistencies in inner surface 524 or in outer surface 526 that might affect the performance or life of tube assembly 500.

Bridging structure 528 may not be attached to inner surface 524 or outer surface 526 at any point. Alternatively, bridging structure 528 may be attached to inner surface 524 or to outer surface 526, or to both inner surface 524 and outer surface 526, at one or more points in any appropriate manner. For example, without limitation, bridging structure 528 may be welded or adhesively bonded to outer tube 508 to inner tube 510 or to both outer tube 508 and inner tube 510.

Bridging structure 528 is made of electrically conductive material 534. For example, without limitation, bridging structure 528 may be made of titanium 536, stainless steel 538, another electrically conductive material, or a combination of electrically conductive materials.

Bridging structure 528 may be implemented in a variety of forms. For example, without limitation, bridging structure 528 may be implemented as bundle of strands of filaments 540, mesh 542, foam 544, spring 546, or as another structure made of electrically conductive material 534. For example, bundle of strands of filaments 540 may form a steel wool structure of stainless steel 538 or of another electrically conductive material.

The manner in which bridging structure 528 is mounted in channel 522 may depend on the form of bridging structure 528 and the materials from which bridging structure 528 is formed. For example, without limitation, bridging structure 528 may be formed as an electrically conductive chloroprene o-ring. In this case, bridging structure 528 may be retained in channel 522 using an appropriate adhesive that attaches bridging structure 528 to one or both of outer tube 508 and inner tube 510. As another example, bridging structure 528 may be formed as a screen made of titanium or another electrically conductive material or combination of materials. In this case, bridging structure 528 may be installed in channel 522 with a wet primer, fuel tank sealant, or other sealant material or combination of materials. Outer tube 508 then may be swagged down around inner tube 510 to intermesh bridging structure 528.

As an example, spring 546 may be formed in spring forming apparatus 548. Spring forming apparatus 548 may include mandrel 550 having plurality of sides 552. For example, without limitation, mandrel 550 may have six sides. In this case, the cross-sectional shape of mandrel 550 is hexagonal 554.

Spring 546 may be formed by wrapping a length of electrically conductive material 556 around plurality of sides 552 of mandrel 550. Electrically conductive material 556 for forming spring 546 in this manner may include, without limitation, wire 558, strip 560 of electrically conductive material 556, or an elongated piece of electrically conductive material 556 in another form.

In accordance with an advantageous embodiment, first retainer 562 may be placed in channel 522 on one side of bridging structure 528. Second retainer 564 may be placed in channel 522 on another side of bridging structure 528. Therefore, bridging structure 528 is positioned between first retainer 562 and second retainer 564 in channel 522. First retainer 562 and second retainer 564 are configured to prevent movement of bridging structure 528 in channel 522.

First retainer 562 and second retainer 564 may be made from the same or different conductive or nonconductive material, sealant, or combination of materials. For example, without limitation, first retainer 562 may be made of electrically insulating material 566 and second retainer 564 may be made of electrically insulating material 568. First retainer 562 and second retainer 564 may be made of any appropriate material and using any appropriate fabrication technique to form structures that may be placed and maintained in channel 522 to prevent movement of bridging structure 528 in channel 522 preferably without causing inconsistencies in outer tube 508 or in inner tube 510. For example, without limitation, one or both of first retainer 562 and second retainer 564 may be made of a sealant, such as a fuel tank sealant. In this case, the sealant may bond bridging structure 528 to outer tube 508 and inner tube 510.

In one advantageous embodiment, second retainer 564 may be positioned at end 570 of outer tube 508. Inner tube 510 may extend from outer tube 508 at end 570 of outer tube 508.

The illustration of FIG. 5 is not meant to imply physical or architectural limitations to the manner in which different advantageous embodiments may be implemented. Other components in addition to, in place of, or both in addition to and in place of the ones illustrated may be used. Some components may be unnecessary in some advantageous embodiments. Also, the blocks are presented to illustrate some functional components. One or more of these blocks may be combined or divided into different blocks when implemented in different advantageous embodiments.

For example, a seal may be placed at end 570 of outer tube 508 adjacent to second retainer 564. Alternatively or additionally, second retainer 564, first retainer 562, or both may be configured to provide such a seal. Such a seal may be used to prevent any gas, liquid, or other material in channel 522 from leaking out of end 570 of outer tube 508. For example, such a seal may be used to seal a gas, such as argon gas, or a vacuum in channel 522 to provide thermal insulation for tube assembly 500.

As another example, bridging structure 528 may seal channel 522 while also providing an electrostatic connection between outer tube 508 and inner tube 510. For example, without limitation, bridging structure 528 may be formed from a sealant including an additive to make it conductive. As one such example, bridging structure 528 may be made of a fuel tank sealant or other sealant material with graphite fibers or other materials or combinations of materials added to make bridging structure 528 conductive.

Figure 6:
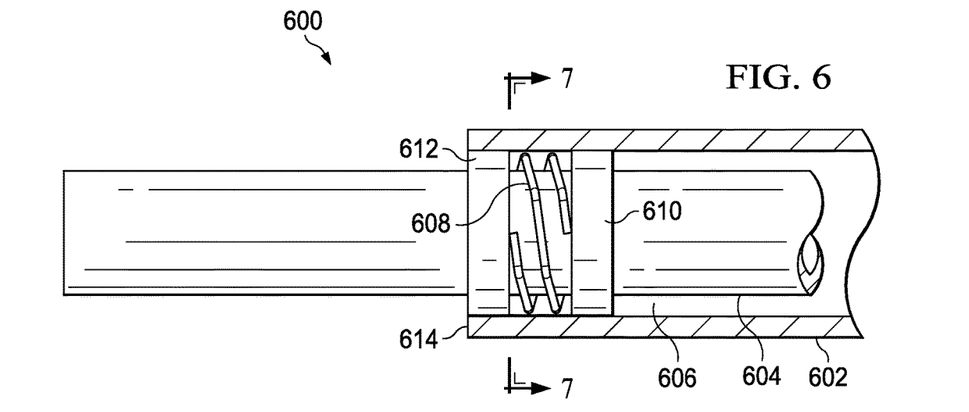
FIG. 6 is an illustration of electrostatic bonding of coaxial tubing using a spring bridging structure in accordance with an advantageous embodiment.

Turning to FIG. 6, an illustration of electrostatic bonding of coaxial tubing using a spring bridging structure is depicted in accordance with an advantageous embodiment. In this example, coaxial tubing 600 is an example of tube assembly 500 in FIG. 5.

Coaxial tubing 600 includes outer tube 602 and inner tube 604. Inner tube 604 is positioned inside of outer tube 602. Inner tube 604 is separated from outer tube 602 to form channel 606 between inner tube 604 and outer tube 602.

Spring 608 is positioned in channel 606 such that spring 608 forms an electrostatic connection between outer tube 602 and inner tube 604. Spring 608 is in mechanical contact with outer tube 602 at a plurality of points and is in mechanical contact with inner tube 604 at a plurality of points but is not attached to outer tube 602 or to inner tube 604 at any point.

First retainer 610 is positioned in channel 606 on one side of spring 608. Second retainer 612 is positioned in channel 606 on another side of spring 608. Therefore, spring 608 is positioned between first retainer 610 and second retainer 612 in channel 606. First retainer 610 and second retainer 612 are configured to prevent movement of spring 608 in channel 606.

In accordance with this advantageous example, first retainer 610, spring 608, and second retainer 612 are positioned at or near end 614 of outer tube 602. In particular, second retainer 612 may be positioned at end 614 of outer tube 602. Inner tube 604 extends from end 614 of outer tube 602.

Figure 7:
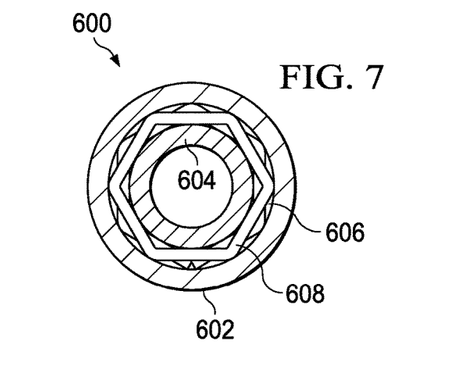
FIG. 7 is an illustration of electrostatic bonding of coaxial tubing using a spring bridging structure in accordance with an advantageous embodiment.

Turning now to FIG. 7, an illustration of electrostatic bonding of coaxial tubing 600 in FIG. 6 using a spring bridging structure is depicted in accordance with an advantageous embodiment as taken along line 7-7 of FIG. 6.

Figure 8:
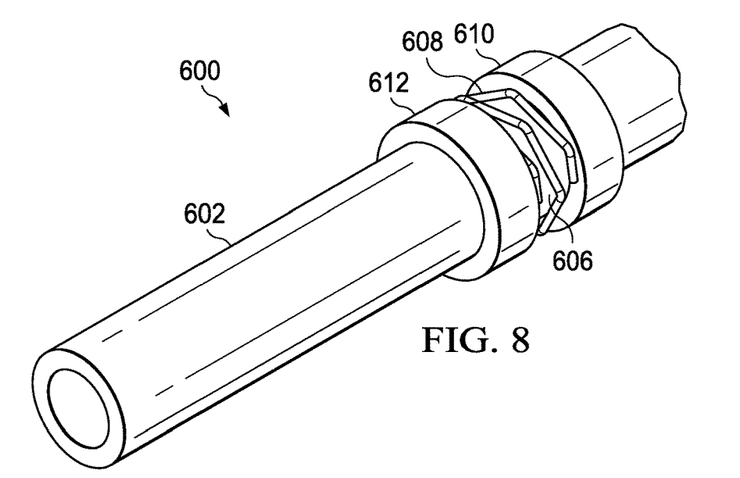
FIG. 8 is an illustration of a perspective view of electrostatic bonding of coaxial tubing using a spring bridging structure in accordance with an advantageous embodiment.

Turing now to FIG. 8, an illustration of a perspective view of electrostatic bonding of coaxial tubing 600 in FIG. 6 using a spring bridging structure is depicted in accordance with an advantageous embodiment. In this illustration, outer tube 604 in FIG. 6 is removed to show the positions of spring 608, first retainer 610, and second retainer 612 more clearly.

Figure 9:
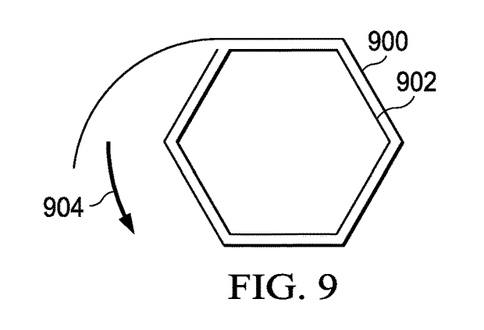
FIG. 9 is an illustration of forming a spring bridging structure for electrostatic bonding of coaxial tubing in accordance with an advantageous embodiment.

Turning now to FIG. 9, an illustration of forming a spring bridging structure for electrostatic bonding of coaxial tubing is depicted in accordance with an advantageous embodiment. In this example, a spring bridging structure is formed by wrapping elongated electrically conductive material 900 around hexagonal mandrel 902 in the direction indicated by arrow 904. For example, without limitation, elongated electrically conductive material 900 may be a wire or flattened strip of electrically conductive material.

Figure 10:
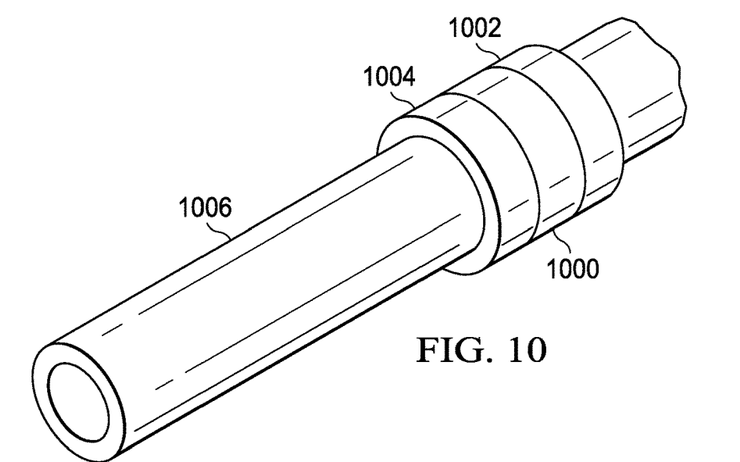
FIG. 10 is an illustration of a perspective view of electrostatic bonding of coaxial tubing using another bridging structure in accordance with an advantageous embodiment.

Turing to FIG. 10, an illustration of a perspective view of electrostatic bonding of coaxial tubing using another bridging structure is depicted in accordance with an advantageous embodiment. In this example, bridging structure 1000 is positioned between first retainer 1002 and second retainer 1004 on inner tube 1006. First retainer 1002 and second retainer 1004 are configured to prevent movement of bridging structure 1000 along inner tube 1006. In this illustration, the outer tube that forms a coaxial tube with inner tube 1006 is removed to show the positions of bridging structure 1000, first retainer 1002, and second retainer 1004 on inner tube 1006 more clearly.

Figure 11:
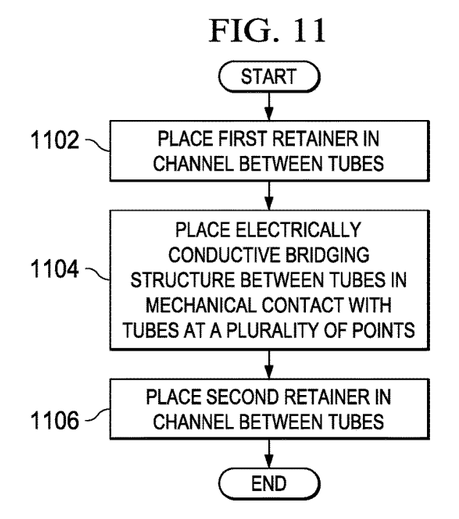
FIG. 11 is an illustration of a flowchart of a process for electrostatic bonding of coaxial tubing in accordance with an advantageous embodiment.

Turning now to FIG. 11, an illustration of a flowchart of a process for electrostatic bonding of coaxial tubing is depicted in accordance with an advantageous embodiment. The process in FIG. 11 may be used, for example, to form tube assembly 500 in FIG. 5.

The process begins by placing a first retainer in the channel between the inner tube and the outer tube of a coaxial tube (operation 1102). An electrically conductive bridging structure is placed in the channel between the tubes in mechanical contact with the tubes at a plurality of points (operation 1104). The bridging structure is not attached to the inner tube or to the outer tube at any point. The bridging structure forms an electrostatic connection between the inner and outer tubes. A second retainer is then placed in the channel between the inner and outer tubes of the coaxial tube (operation 1106), with the process terminating thereafter. The bridging structure is positioned in the channel between the first retainer and the second retainer. The first retainer and the second retainer are configured to prevent the electrically conductive bridging structure from moving in the channel between the tubes.

Figure 12:
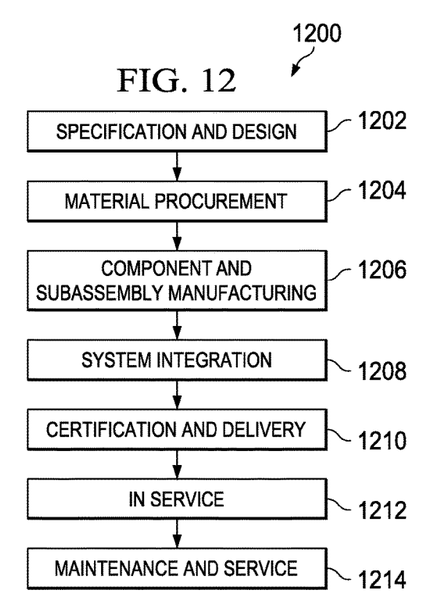
FIG. 12 is an illustration of a block diagram of an aerospace vehicle manufacturing and service method in accordance with an advantageous embodiment.
Figure 13:
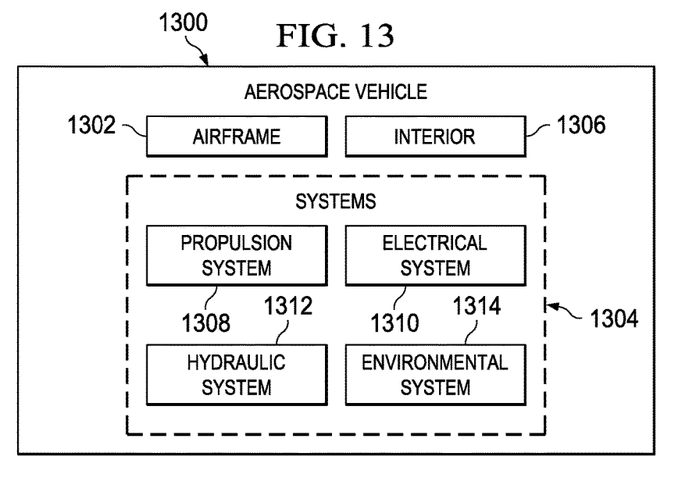
FIG. 13 is an illustration of a block diagram of an aerospace vehicle in which an advantageous embodiment may be implemented.

Embodiments of the disclosure may be described in the context of aerospace vehicle manufacturing and service method 1200 as shown in FIG. 12 and aerospace vehicle 1300 as shown in FIG. 13. Turning first to FIG. 12, an illustration of a block diagram of an aerospace vehicle manufacturing and service method is depicted in accordance with an advantageous embodiment.

During pre-production, aerospace vehicle manufacturing and service method 1200 may include specification and design 1202 of aerospace vehicle 1300 in FIG. 13 and material procurement 1204. During production, component and subassembly manufacturing 1206 and system integration 1208 of aerospace vehicle 1300 in FIG. 13 takes place. Thereafter, aerospace vehicle 1300 in FIG. 13 may go through certification and delivery 1210 in order to be placed in service 1212.

While in service 1212 by a customer, aerospace vehicle 1300 in FIG. 13 is scheduled for routine maintenance and service 1214, which may include modification, reconfiguration, refurbishment, and other maintenance or service. In this example, aerospace vehicle manufacturing and service method 1200 is shown as a method for aerospace vehicles. The different advantageous embodiments may be applied to other types of manufacturing and service methods, including manufacturing and service methods for other types of platforms, including other types of vehicles.

Each of the processes of aerospace vehicle manufacturing and service method 1200 may be performed or carried out by a system integrator, a third party, an operator, or by any combination of such entities. In these examples, the operator may be a customer. For the purposes of this description, a system integrator may include, without limitation, any number of aerospace vehicle manufacturers and major-system subcontractors; a third party may include, without limitation, any number of venders, subcontractors, and suppliers; and an operator may be a company, a military entity, a service organization, and so on.

With reference now to FIG. 13, an illustration of a block diagram of an aerospace vehicle in which an advantageous embodiment may be implemented is depicted. In this advantageous example, aerospace vehicle 1300 is produced by aerospace vehicle manufacturing and service method 1200 in FIG. 12. Aerospace vehicle 1300 may include an aircraft, a spacecraft, or any other vehicle for travelling through the air, through space, or is capable of operation in both air and space. Aerospace vehicle 1300 may include airframe 1302 with a plurality of systems 1304 and interior 1306.

Examples of plurality of systems 1304 include one or more of propulsion system 1308, electrical system 1310, hydraulic system 1312, and environmental system 1314. Advantageous embodiments may be used to provide electrostatic bonding of coaxial tubing in plurality of systems 1304. For example, without limitation, advantageous embodiments may be used to provide electrostatic bonding of coaxial tubing used to carry hydraulic fluid used in hydraulic system 1312. As another example, advantageous embodiments may be used to provide electrostatic bonding of coaxial tubing used to carry fuel for use by engines in propulsion system 1308. Although an aerospace example is shown, different advantageous embodiments may be applied to other industries, such as the automotive industry.

An apparatus and method embodied herein may be employed during at least one of the stages of aerospace vehicle manufacturing and service method 1200 in FIG. 12. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one advantageous example, components or subassemblies produced in component and subassembly manufacturing 1206 in FIG. 12 may be fabricated or manufactured in a manner similar to components or subassemblies produced while aerospace vehicle 1300 is in service 1212 in FIG. 12.

As yet another example, a number of apparatus embodiments, method embodiments, or a combination thereof may be utilized during production stages, such as component and subassembly manufacturing 1206 and system integration 1208 in FIG. 12. A number of apparatus embodiments, method embodiments, or a combination thereof may be utilized while aerospace vehicle 1300 is in service 1212, during maintenance and service 1214, or both.

The use of a number of the different advantageous embodiments may substantially expedite the assembly of aerospace vehicle 1300. Alternatively or additionally, a number of the different advantageous embodiments may reduce the cost of aerospace vehicle 1300. For example, one or more of the different advantageous embodiments may be used during component and subassembly manufacturing 1206, during system integration 1208, or both. The different advantageous embodiments may be used during these parts of aerospace vehicle manufacturing and service method 1200 to provide electrostatic bonding of coaxial tubing without reducing the performance or service life of the tubing.

Further, the different advantageous embodiments also may be implemented while in service 1212, during maintenance and service 1214, or both to provide electrostatic bonding for coaxial tubing that may be present in aerospace vehicle 1300.

The description of the different advantageous embodiments has been presented for purposes of illustration and description and is not intended to be exhaustive or to limit the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
   an outer tube that comprises a first electrically conductive material and an inner surface, such that the outer tube surrounds, along a full length of the outer tube, an inner tube that comprises a second electrically conductive material and an outer surface, the inner tube positioned inside the outer tube such that the outer surface of the inner tube and the inner surface of the outer tube define a channel configured to retain a thermal insulation material configured to insulate the inner tube within the full length of the outer tube and to contain, within the channel, a leak from the inner tube into the channel;
   an elongated strip that comprises a third electrically conductive material formed in a non-continuous hexagonal loop that comprises six sides and six corners positioned in the channel such that the elongated strip mechanically contacts and forms first electrostatic connections with the inner surface of the outer tube at the six corners and mechanically contacts and forms second electrostatic connections with the outer surface of the inner tube at one point on each of the six sides;
   a first sealant configured to bond to the channel on one side of the elongated strip and to bond with the elongated strip in a first manner that prevents movement of the elongated strip; and
   a second sealant configured to fill and seal the channel at an end of the outer tube and on another side of the elongated strip and to bond with the elongated strip in a second manner that prevents movement of the elongated strip in the channel.

2. The apparatus of claim 1, wherein the elongated strip is selected from a group of structures that comprises: a mesh, a foam, and a bundle of strands of filaments.

3. The apparatus of claim 1, wherein the first sealant and the second sealant each comprise an electrically insulating material.

4. The apparatus of claim 1, wherein the inner tube extends beyond the end of the outer tube.

5. The apparatus of claim 1, wherein the apparatus is located on an aircraft.

6. The apparatus of claim 1, wherein the elongated strip comprises a material selected from a group of materials consisting of titanium and stainless steel.

7. The apparatus of claim 1, wherein the elongated strip is not attached to the inner surface of the outer tube or the outer surface of the inner tube at any point.

8. A method for electrically bonding tubing, comprising:
forming an elongated strip comprising a non-continuous loop comprising six sides and six corners via wrapping a first electrically conductive material around a hexagonal mandrel;
forming a channel between a full length of an outer tube surrounding an inner tube;
forming an electrostatic connection between a second electrically conductive material on an inner surface of the outer tube and a third electrically conductive material on an outer surface of the inner tube via placing the elongated strip in the channel between the outer tube and the inner tube in mechanical and electrostatic contact with the inner surface of the outer tube at six corners and in mechanical and electrostatic contact with the outer surface of the inner tube at one point on each of the six sides, the inner tube carrying a fluid;
thermally insulating the inner tube via the channel retaining a thermal insulation material, and configuring to contain a leak of fluid from the inner tube into the channel;
placing a first retainer in the channel on one side of the elongated strip, the first retainer contacting the outer surface of the inner tube and the inner surface of the outer tube and bonding to the elongated strip;
placing a second retainer in the channel on another side of the elongated strip, the second retainer contacting the outer surface of the inner tube and the inner surface of the outer tube and bonding to the elongated strip, thereby positioning the elongated strip between the first retainer and the second retainer and preventing movement of the elongated strip in the channel, the first retainer and the second retainer each comprising an electrically insulating material; and
the second retainer forming a seal at an end of the channel and the outer tube sealing off the end of the channel and the outer tube and preventing fluid from leaking from the channel out of the end of the outer tube.

9. The method of claim 8, wherein the first retainer and the second retainer each comprise a sealant.

10. The method of claim 8, further comprising the channel retaining an insulating fluid.

11. The method of claim 8, further comprising selecting the elongated strip from a material selected from a group of materials consisting of: titanium, foam, and stainless steel.

12. The method of claim 8, further comprising the elongated strip remaining unattached to the inner surface of the outer tube and the outer surface of the inner tube at any point.

13. The method of claim 8, wherein the inner tube and the outer tube pass into a fuel tank of an aircraft, and further comprising passing fuel through the inner tube into the fuel tank.

14. The method of claim 8, wherein the inner tube and the outer tube are positioned in an aircraft, and further comprising passing hydraulic fluid through the inner tube.

15. An apparatus positioned in an aircraft, such that the apparatus comprises:
an outer tube that comprises a first electrically conductive material and an inner surface;
an inner tube that comprises a second electrically conductive material and an outer surface, the inner tube positioned inside the outer tube in a coaxial arrangement such that the outer surface of the inner tube and the inner surface of the outer tube define a channel that extends for a full length of the outer tube, the channel configured to retain a thermal insulation material configured to insulate the inner tube, the inner tube configured to carry aircraft fuel, and the channel configured to contain a leak of aircraft fuel from the inner tube into the channel, wherein the inner tube and the outer tube pass into a fuel tank of the aircraft, and fuel passes through the inner tube into the fuel tank;
an elongated strip that comprises a non-continuous loop that comprises six sides and six corners and a third electrically conductive material, the elongated strip positioned in the channel such that the elongated strip forms an electrostatic connection between the electrically conductive material on the inner surface of the outer tube at the six corners and the electrically conductive material on the outer surface of the inner tube at six points on each of the six sides;
a first retainer positioned in the channel on one side of the elongated strip, such that the first retainer contacts the outer surface of the inner tube and the inner surface of the outer tube and bonds to the elongated strip; and
a second retainer positioned in the channel at an end of the outer tube and on another side of the elongated strip, such that the second retainer contacts the outer surface of the inner tube and the inner surface of the outer tube, bonds to the elongated strip, and seals the end of the outer tube and the channel, wherein the first retainer and the second retainer each comprise electrically insulating materials configured to prevent movement of the elongated strip in the channel.

16. The apparatus of claim 15, wherein the elongated strip is formed by wrapping the third electrically conductive material around a mandrel that comprises a hexagonal cross-section.

17. The apparatus of claim 15, wherein at least a portion of the outer tube and the inner tube pass through the fuel tank.

18. The apparatus of claim 17, further comprising the first retainer and the second retainer each comprising a sealant.

19. The apparatus of claim 15, wherein the inner tube and the outer tube comprise titanium.

20. The apparatus of claim 15, wherein the thermal insulation material comprises a fluid.

* * * * *